March 24, 1959     A. D. GARRISON     2,879,398
DETECTION OF RADIATION
Filed May 13, 1953

INVENTOR.
ALLEN D. GARRISON
BY
ATTORNEY

United States Patent Office 2,879,398
Patented Mar. 24, 1959

2,879,398

DETECTION OF RADIATION

Allen D. Garrison, Houston, Tex., assignor to Texaco Development Corporation, New York, N.Y., a corporation of Delaware Application May 13, 1953, Serial No. 354,808

10 Claims. (Cl. 250—71)

This invention relates to the detection and measurement of penetrative radiation such as gamma radiation and more particularly to luminophors or phospor elements for such purposes.

This application is a continuation of copending U.S. application, Serial No. 204,720, filed January 6, 1951, now abandoned.

So-called scintillation detectors or counters for the detection and measurement of penetrative radiation such as gamma rays ordinarily comprise a luminophor or phosphor, usually in the solid phase. Such a phosphor is characterized by its ability to convert the received penetrative radiation to radiation capable of being detected and counted by other means such as a phototube of the electron multiplier type. Such a phosphor must be transparent or translucent to its own luminescent light, i.e., to the light comprising the scintillations developed therein by reason of interactions with gamma photons. The luminescent event or scintillation is the required physical effect in such a detector, and the quality of transparency or translucency is necessary to permit the light of the scintillation to escape from the interior of the phosphor for physical observation.

A marked advantage of the scintillation detector over the more conventionally used Geiger-Mueller detector is that the scintillation detector "head" is a solid of greater density as contrasted to the less dense head, i.e., the hollow, gas-filled head of the Geiger-Mueller counter. Consequently, in the scintillation counter there is a much greater probability of the gamma radiation interacting and producing the desired physical effects, this feature being considered to be responsible for the scintillation detector having from 10 to 100 times the detecting efficiency of the conventional Geiger-Mueller counter.

In the scintillation detector, the phosphor element is arranged so that light of the scintillations produced in the phosphor is discharged from the phosphor onto the cathode of a photo-multiplier tube which converts each scintillation of light into an electrical pulse and amplifies the pulse. Tubes commonly used for this purpose include RCA types 931A, 1P21, 1P28 and 5819.

Substances such as naphthalene, anthracene, stilbene, zinc sulfide, zinc silicate, calcium tungstate, and cadmium tungstate have been proposed as phosphors. Such phosphors possess inherent limitations. For example, the sizes of the crystals that can be prepared from such materials are exceedingly small, resulting in a corresponding limitation in use. Difficulty has been encountered in growing good crystals of the inorganic type to sizes larger than 10 grams and in the organic type to sizes larger than 100 grams.

A further limitation is found in the fact that many of such luminophors or phosphors, once they have been successfully grown to their maximum sizes, will have assumed physical forms which are neither convenient for direct use with photo-multiplier tubes or for handling to reshape them. In addition these crystals and/or so-called "slabs" thereof are often exceedingly delicate and fragile and are generally unsuitable for withstanding the wear and tear incident on a day to day use. Moreover, even under good storage conditions, such crystals tend to fragmentate, striate and become opaque with a corresponding loss in efficiency.

It is very important that the phosphor element or luminophor have a shape which affords it good light coupling to the cathode of the photo-multiplier tube. Thus, unless the slab can be arranged to direct the major portion of its scintillations upon the cathode of the photo-multiplier tube, the efficiency of the detector as a whole may be considerably reduced.

In overcoming the aforesaid disadvantages of the prior art, it is an object of this invention to provide a counter of the scintillation type embodying a novel phosphor element capable of being employed in any geometry and in almost any mass desired.

Another object of the invention is to provide a novel phosphor element capable of use over an extended period of time without deterioration and without loss of efficiency.

Further objects and advantages of the invention will appear from the following description and attached claims taken in connection with the drawings wherein:

Briefly stated, this invention involves the rendering of a first normally solid phosphor whose light emissions occur in a suitable spectral range for exciting the cathode of the photo-multiplier tube into liquid form by dissolving it in a solvent which is capable of absorbing radiation, becoming activated and transmitting the activated energy to the said dissolved phosphor, whereby it will be possible to provide a luminescent detector head which has inherently good efficiency for converting quanta of penetrative radiation into light scintillations and which can be shaped as desired to conform best to the sources of radiation on the one hand and to the cathode of the photo-multiplier tube or other light detecting means on the other to thereby improve the overall efficiency of the detector. More specifically the species of the invention claimed in this continuation case involve the use of solutions as phosphors in which the solute is anthranilic acid and the solvent is an aromatic solvent such as one of the hydrocarbon solvents benzene, toluene, xylene and butyl benzene. I have found that it is not necessary to use any particular critical concentrations for the solutions in order for them to operate successfully as luminophors. However, variations in concentration do cause observable changes in efficiency. In general the highest efficiency will be afforded by near saturated solutions.

Figure 1:
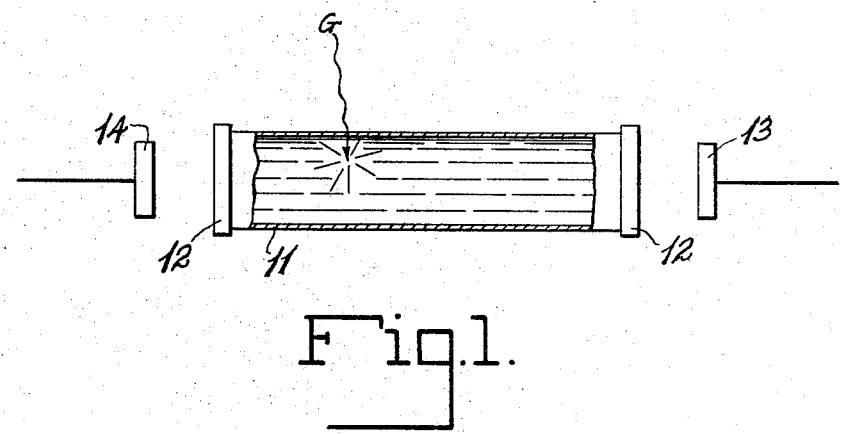
Fig. 1 is a diagrammatic showing of a scintillation counter embodying the present invention.
Figure 2:
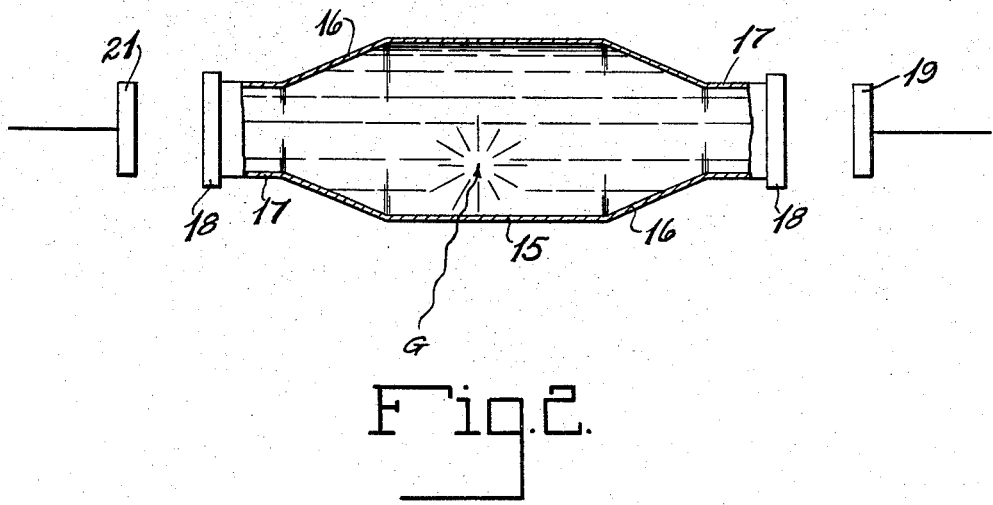
Fig. 2 is a modification of the counter of Fig. 1.

The liquid phosphor element disclosed herein can be used in containers of different shapes, as required by the geometry of the radiation source and the photo-multiplier tube, the one shown in Figs. 1 and 2 being typical.

In Fig. 1, a container 11 of glass, metal or plastic or equivalent material which is transparent to the activating radiation is lined on its interior with aluminum or a similar reflecting medium to reflect the scintillations developed therein. Transparent windows 12 are provided at one or both ends opposite photo-multiplier tube cathodes 13 and 14 of conventional character, such cathodes being elements of tubes (not shown) of the types already described and connected into a counting and amplifying circuit in conventional manner. Since such circuits are well known to the art, a detailed description thereof is considered unnecessary.

In the arrangement of Fig. 1, a gamma ray G striking the detector will pass through wall 11 and interact with the contained solution therein with the result that one or more scintillations will be given off. Those particular rays of the scintillations in line with end windows 12 will pass directly to the cathodes of the adjacent multiplier photo tubes, a substantial proportion of the remaining rays being reflected by the internal walls of the detector and eventually discharged through the end windows. If desired, the light-input cathode ends of the envelopes of the photo tubes may be actually incorporated into the structure of the container 11 to form integral parts thereof and to serve as its needed transparent light-output end windows. Thus light originating in the liquid luminophor will not have to pass through double thicknesses of glass (as well as through intermediate air gaps) to reach the cathodes 13, 14.

Fig. 2 shows a slightly different arrangement wherein the geometry of the container permits the use of an increased volume of sensitive luminescent material while at the same time permitting satisfactory escape of light from the developed scintillations through the transparent end walls of the cell. As shown in Fig. 2, the container for the luminophor has a central section 15 of enlarged cross sectional size which, as a light pipe, is optically coupled to a pair of substantially-smaller photo-cathodes 19, 21 over a pair of tapered frusto-conical intermediate sections 16 and a pair of end sections 17 of about the same cross sectional size as the areas of the cathodes (all of these sections being filled with the transparent liquid luminophor), and finally over a pair of transparent end windows. On interaction of a gamma ray with the contained solution, scintillations are developed within the detector, some of the light rays comprising the scintillation passing directly through the transparent end windows 18. Other rays will strike the side walls of the container and, due to its being lined with reflecting material will be reflected. Since the frusto-conical sections 16 and their contents will act as condensing light pipes substantially all of the rays of light emitted in each developed scintillation will eventually be discharged through the transparent end windows 18 in directions toward the cathodes 19, 21 of the adjacent photo-multiplier tubes.

By the use of solutions of the type described and a container therefor of the desired size and shape, a phosphor element of any desired geometry can be prepared. Additionally, the size of the container and therefore the mass of liquid contained in it can be varied as desired to suit the purpose for which the counter is to be used.

My experimental findings support the conclusion that there is synergistic cooperation between the solvent and the solute, e.g., that a scintillometer using as its detector head a solution of a given quantity of anthranilic acid in a given quantity of any of the solvents mentioned above will have a higher detection efficiency than a scintillometer using as its detector head equal quantities of the solute and solvent exposed to the same radiation while in closely juxtaposed relationship rather than in the relationship of the one being dissolved in the other. In other words the number of output electrical pulses attributable to the scintillations produced by the compact mass of the undissolved quantity of anthranilic acid added to the number of pulses attributable to any scintillations produced by the quantity of solvent in question will be smaller than the number of output pulses of a scintillometer employing as its detector head a solution of the former dissolved in the latter. It is evident that the radiation absorbed by the solvent is transmitted to the solute. This causes the solute to scintillate not only from radiation which it receives directly, but also from a substantial part of the radiation absorbed by the solvent.

Obviously many modifications and variations of the invention as above set forth may be made without departing from the spirit and scope thereof, and therefore only such limitations should be imposed as are indicated in the appended claims.

I claim:

1. A detector comprising luminophor means for translating penetrative radiation into light and a photo-electric device in cooperative optical relationship with said means for responding to said light to produce electrical signals representative of variations thereof, said means comprising a solution of anthranilic acid in a liquid aromatic hydrocarbon solvent.

2. A detector as in claim 1 in which said solution is substantially saturated.

3. A detector as in claim 1 in which said means comprises an envelope containing said solution, substantially all of the walls of the envelope are permeable to penetrative radiation to be detected by the detector and at least one wall portion of the envelope is transparent to light of the wave lengths in which anthranilic acid fluoresces to serve as a window through which light may pass from said solution to said photo-electric device.

4. A detector as in claim 3 which comprises a second photo-electric device in the same kind of optical and cooperative relationship with said luminophor means as said first-mentioned photo-electric device and in which said envelope is of elongated tubular geometry, has two light transparent windows each one being located at a respective one of its opposite ends and in a position to be optically related to a respective one of said devices, and is light reflective on the interior surfaces of its side walls whereby it acts as a light pipe to transmit internally produced fluorescent light toward the windows at its opposite ends.

5. A detector as in claim 4 in which said tubular envelope is thicker in a central portion thereof than in its end portions and comprises a pair of tapered portions respectively connecting the ends of said central portion to said windows and serving as convergent light pipes therebetween.

6. A detector comprising luminophor means for translating penetrative radiation into light and a photo-electric device in cooperative optical relationship with said means for responding to said light to produce electrical signals representative of variations thereof, said means comprising a solution of anthranilic acid in a solvent selected from the group of liquids consisting of benzene, toluene, xylene and butyl benzene.

7. A detector comprising luminophor means for translating penetrative radiation into light and a photo-electric device in cooperative optical relationship with said means for responding to said light to produce electrical signals representative of variations thereof, said means comprising a solution of anthranilic acid in benzene.

8. A detector comprising luminophor means for translating penetrative radiation into light and a photo-electric device in cooperative optical relationship with said means for responding to said light to produce electrical signals representative of variations thereof, said means comprising a solution of anthranilic acid in toluene.

9. A detector comprising luminophor means for translating penetrative radiation into light and a photo-electric device in cooperative optical relationship with said means for responding to said light to produce electrical signals representative of variations thereof, said means comprising a solution of anthranilic acid in xylene.

10. A detector comprising luminophor means for translating penetrative radiation into light and a photo-electric device in cooperative optical relationship with said means for responding to said light to produce electrical signals representative of variations thereof, said means comprising a solution of anthranilic acid in butyl benzene.

References Cited in the file of this patent

UNITED STATES PATENTS

| 2,686,266 | Pringle et al. | Aug. 10, 1954 |
| 2,698,906 | Reynolds et al. | Jan. 4, 1955 |

OTHER REFERENCES

Kallman: "Scintillation Counting with Solutions," The Physical Review, vol. 78, pp. 221, 222, July 1950.

Luminescence of Liquids and Solids by Pringsheim and Vogel, copyright 1943, by Interscience Publishers, Inc., N.Y., N.Y., pp. 53–58.

J. Chem. Society (London), Transactions, part 2, article by Farmer and Worth, 1904, New Series, vol. 85, p. 1715.